United States Patent [19]

Yamachika

[11] Patent Number: 5,125,817

[45] Date of Patent: Jun. 30, 1992

[54] INJECTION HEAD

[75] Inventor: Mitsuaki Yamachika, Hiroshima, Japan

[73] Assignee: The Japan Steel Works, Ltd., Tokyo, Japan

[21] Appl. No.: 651,026

[22] Filed: Feb. 5, 1991

[30] Foreign Application Priority Data

Feb. 5, 1990 [JP] Japan ................................ 2-24392
May 10, 1990 [JP] Japan ................................ 2-118674

[51] Int. Cl.⁵ ............................................. B29C 45/13
[52] U.S. Cl. ............................. 425/130; 264/328.8; 264/328.13; 425/562; 425/564
[58] Field of Search ............ 425/130, 133.1, 562, 425/564, 566, 573; 264/328.8, 328.13

[56] References Cited

U.S. PATENT DOCUMENTS

| | | | |
|---|---|---|---|
| 3,947,175 | 3/1976 | Melcher | 425/130 |
| 4,117,955 | 10/1978 | Sokolow | 425/130 |
| 4,685,881 | 8/1987 | Sasaki | 425/562 |
| 5,030,076 | 7/1991 | Ebenhofer | 425/130 |

FOREIGN PATENT DOCUMENTS 59-220341 12/1984 Japan .
63-94805 4/1988 Japan .
3-75114 3/1991 Japan .

Primary Examiner—Tim Heitbrink
Attorney, Agent, or Firm—Oblon, Spivak, McClelland, Maier & Neustadt

[57] ABSTRACT

In the nozzle tip at the tip of an injection head, a first conical hole, an inner sealing portion and a second conical hole are formed in series. An inside torpedo is slidably guided in the inner hole of the outside torpedo. A sealing surface is formed on the outer peripheral surface of the front edge portion of the inside torpedo. The inside torpedo has a hole communicating the center of the front edge portion with the outer peripheral surface of the rear edge portion of the inside torpedo. A sealing portion is formed in the rear edge position. The position of the opening at the outer peripheral surface of the rear edge portion of the communicating hole of the inside torpedo is set at a position such that upon the forward movement of the inside torpedo, when the insertion of the sealing surface of the inside torpedo into the inner sealing portion is started, the opening is not inserted into the inner hole of the outside torpedo, and just before the inside torpedo reaches the limit of its forward movement, the opening is inserted into the inner hole of the outside torpedo and is completely closed.

7 Claims, 10 Drawing Sheets

1

INJECTION HEAD

FILED OF THE INVENTION

The present invention relates to an injection head which can mold a sandwich molded article by injecting fused resins to form a skin layer and a core layer and can also execute hollow molding, foaming molding, and single molding.

BACKGROUND OF THE INVENTION

As a conventional injection head of an injection molding machine, the prior art includes an injection head disclosed in Japanese Patent Application No. 210709/89 which was filed by the same applicant as the present invention and which will be explained below. As shown in FIG. 7, an outside torpedo 2' is arranged behind a nozzle tip 1, in the main body of the injection head 7'. A valve housing 6' arranged in the main body of the injection head 7' is joined to the rear portion of the outside torpedo 2'. An outside passage 8' is formed between the inner peripheral surface of the main body of the injection head 7' and the outer peripheral surface of the valve housing 6'. A center shaft 5' which is reciprocated by a reciprocation drive 17' comprising a hydraulic cylinder, and a piston, and the like is inserted into the valve housing 6' and an inside passage 9' is formed between the valve housing 6' and the center shaft 5'.

In the nozzle tip 1', a conical hole which enlarges to the rear from the nozzle hole 1a', an inner sealing portion 1b' consisting of a large hole having the same diameter in the axial direction as the rear of the conical hole, and a conical hole which enlarges to the rear from the inner sealing portion 1b' are formed. In addition, an inner hole of the outside torpedo 2' is made up of a large diameter portion 2b' and a small diameter portion 2c' which are formed sequentially from the front, the outside torpedo also having a plurality of through holes 2a' formed in the axial direction. An intermediate large diameter portion 3c' of the inside torpedo 3' which is fixed to the center shaft 5' is slidably guided to the large diameter portion 2b' of the outside torpedo 2, In the inside torpedo 3', tip-sealing surface 3a' projects forward from the intermediate large diameter portion 3c' in which a plurality of through holes 3d' are formed in the axial direction and a sealing portion 3b' projects backward from the intermediate large diameter portion 3c'.

A first injection unit 15' for forming skin layers communicates with the outside passage 8' of the injection head. A second injection unit 16' for forming core layers communicates with the inside passage 9' of the injection head. As shown in FIG. 8, the inside torpedo 3' moves forward or backward, thereby opening or closing the outside passage 8' and inside passage 9'. By injecting different kinds of fused resins from the first and second injection units 15' and 16" a sandwich molded article can be formed by opening and closing the passages 8' and 9'.

On the other hand, the prior art also includes injection heads which are coupled to two injection units of a double-head injection molding apparatus, such as injection heads (A) and (B) disclosed in the following Official Gazettes and the like.

(A) An injection head in which an inside nozzle is concentrically arranged inside an outside nozzle and is slidable in the axial direction and rotatable by a rotating means, a resin passage is opened or closed by the rotation of the inside nozzle, and an operating rod to open or close the nozzle hole of the inside nozzle is arranged in the inside nozzle (Japanese Patent Laid-open No. 220341/84).

(B) An injection head in which an annular insert is concentrically arranged in the main body of the injection head and is arranged slidably in the axial direction, a needle having a connecting passage is rotatably arranged in the annular insert, the connecting passage of which is opened or closed by rotating the needle, thereby enabling a gas to by supplied (Japanese Patent Laid-open No. 94805/88).

In the injection head disclosed in No. 210709/89 mentioned above, an inside torpedo has an intermediate large diameter portion. Therefore, as shown in FIG. 8, when the inside torpedo is moved backward at time $t_2$, only the outside passage is opened, and a resin for a skin layer can be injected At this time, the volume of the gap portion of the inner hole of the outside torpedo is largely decreased by the intermediate large diameter portion of the inside torpedo, causing the pressure of the gap portion to rise. Therefore, as a result of the backward movement of the inside torpedo, the resins for the core layer filling a plurality of through holes in the inside torpedo during injection molding immediately prior to the backward motion are not held by the inside torpedo but are extruded forward and are left at a position forward of the inside torpedo, that is, in the front edge portion of the outside passage. Thus, a disadvantage of this arrangement is that the resins for the core layer are mixed into the resins for the skin layer which are supplied from the outside passage to the portion forward of the inside torpedo and a defective portion in which these different resins are mixed consequently occurs in the molded article.

To solve the above problem, a large quantity of resin for the skin layer is allowed to pass from the first injection unit, before the normal injection is started to purge the material in which the resin for the core layer left in the front edge portion of the outside passage is mixed with the resin for the skin layer. The molding work(-process) is therefore complicated and requires additional time and labor and material costs rise. On the other hand, even in cases where the inside torpedo is moved backward at time $t_7$, and only the outside passage is opened and a small quantity of resin for the skin layer is injected, in a manner similar to the above, the resins for the core layer which fill the plurality of through holes of the inside torpedo are not held by the inside torpedo but are extruded forward and are left in the front edge portion of the outside passage. The problem in this case is that the resin for the core layer is mixed into the resin for the skin layer which is supplied from the outside passage to the portion forward of the inside torpedo and consequently, a defective portion in which different materials are mixed still occurs in the molded article.

On the other hand, since the inner sealing portion of the nozzle tip has a large hole which corresponds to the intermediate large diameter portion, upon completion of the injection of the resin for the core layer at time $t_8'$, the quantity of resin for the core layer remaining in the large hole increases. Therefore, there remains the problem that even by draining a small amount of resin for the skin layer just after the backward motion, the remaining resin for the core layer cannot be completely discharged and it is therefore injected into the die mixed with the resin for the skin layer and a defective portion occurs in the molded article.

In the above techniques (A) and (B), the opening/closing mechanisms of the nozzle holes are complicated and since a plurality of driving apparatuses are provided, the controls for opening/closing the nozzle are also complicated. Further, these heads have been developed for sandwich molding and, as a result, single molding from a single head is impossible. Also, the opening or closing operation of the nozzle hole of the outside nozzle is executed by sliding the inside cylinder (or annular insert). Thus, there are problems such as cobwebbing of the fused resin from the nozzle hole which occurs with every shot. It is also difficult to make the injection head in a small diameter due to the limitation of the strength of the nozzle structure.

SUMMARY OF THE INVENTION

The invention has been developed in consideration of the problems associated with conventional nozzles as described above and it is the object of the invention to provide an injection head in which molding work can be simplified, time and labor can be reduced, material costs can be reduced, and good articles free of any defective portions can be efficiently molded.

In addition to the above objects, it is an object of the invention to provide an injection head having a simple structure which can carry out sandwich molding with one injection head and can also carry out hollow molding, foaming molding, single molding and can also prevent cobwebbing between shots.

To accomplish the above objects, the invention provides for an injection head in which an injection head main body having a nozzle tip at its front edge portion has a hole in which a cylindrical outside torpedo is arranged behind the nozzle tip, a cylindrical valve housing which is inserted into the above hole and formed with a sealing surface at its front edge portion is coupled to the rear edge portion of the outside torpedo, an outside passage is formed between the inner peripheral surface of the hole and the outer peripheral surface of the valve housing, a center shaft which is reciprocated by a reciprocation drive is inserted into the valve housing, and an inside passage is formed between the outer peripheral surface of the center shaft and the inner peripheral surface of the valve housing, characterized in that in the nozzle tip, a first conical hole which enlarges towards the rear from the nozzle hole, an inner sealing portion consisting of a small hole connected with the first conical hole and having a constant diameter in the axial direction, and a second conical hole which enlarges towards the rear from the inner sealing portion are formed, an inside torpedo having a cylindrical shape fixed to the tip portion of the center shaft is slidably guided in the inner hole of the outside torpedo, a sealing surface which can be inserted into the inner sealing portion is formed on the outer peripheral surface of the front edge portion of the inside torpedo, the inside torpedo having a communicating hole communicating the center of the front edge with the outer peripheral surface of the rear portion thereof, a sealing portion corresponding to the sealing surface of the valve housing is formed in the rear edge portion, the position of the opening at the outer peripheral surface of the rear portion of the communicating hole of the inside torpedo is set at a position such that upon the forward movement of the inside torpedo, when the insertion of the sealing surface of the inside torpedo into the inner sealing portion is started, the opening is not yet inserted into the inner hole of the outside torpedo, and just before the inside torpedo reaches the limit of its forward movement, the opening is inserted into the inner hole of the outside torpedo and is completely closed.

On the other hand, the conical front edge sealing surface can also be formed at the front edge of the inside torpedo to correspond with the first conical hole of the nozzle tip. A sealing portion can also be formed in the tip portion of the center shaft in place of providing a sealing portion in the rear edge portion of the inside torpedo. A sealing surface can also be formed in the rear edge portion of the outside torpedo in place of providing a sealing surface in the front edge portion of the valve housing.

The nozzle head can also be constructed such that either outside and inside passages of the main body of the injection head are connected to the first and second injection units respectively through shut-off mechanisms or a gas-supply port or ports is/are provided for one or both of the two connecting portions to the first and second injection units of the injection head main body.

The main body of the injection head can also be divided into a plurality of parts.

A double-head injection molding apparatus can be constructed by communicating the first and second injection units with the outside and inside passages of the main body of the injection head. The inside torpedo is moved forward and backward through the center shaft by a reciprocation drive.

When the inside torpedo is moved forward to the limit of its forward motion and the sealing surface is inserted into the inner sealing portion of the nozzle tip, the outside passage is closed and the opening at the outer peripheral surface of the rear portion of the communicating hole of the inside torpedo is inserted into the inner hole of the outside torpedo and is closed, and consequently, the inside passage is also closed.

On the other hand, when the inside torpedo is moved backward to a predetermined rear position and the sealing portion is brought into contact with the sealing surface of the valve housing, the inside passage is closed. Most of the inside torpedo is pulled within the outside torpedo, and the outside passage is fully opened. In such a state, the resin for the skin layer can be injected from the first injection unit.

On the other hand, when the inside torpedo is moved forward from the predetermined rear position to a predetermined first intermediate position and the sealing portion is removed from the sealing surface of the valve housing, the inside passage starts to open and the outside passage opens to a slight degree. Both the inside and outside passages are open, and in this state, the resin for the skin layer and the resin for the core layer can be injected from the first and second injection units, respectively.

When the inside torpedo is moved forward to a predetermined second intermediate position from the above state and the sealing surface is inserted into the inner sealing portion of the nozzle tip, the outside passage is closed and the opening at the outer peripheral surface of the rear portion of the communicating hole is not inserted into the inner hole of the outside torpedo, such that the inside passage is still held in an opened state. In this state, the resin for the core layer can be injected from the second injection unit.

When injection molding is started, the inside torpedo is first moved forward to the limit of its forward motion and stopped at this position, thereby closing both the inside and outside passages. Plasticizing operations of the first and second injection units are then started. After completion of the plasticizing operations, the inside torpedo located at the limit of its forward position is moved backward to a predetermined rear position, thereby opening only the outside passage. The fused resin for forming a skin layer is partially supplied into the outside passage from the first injection unit by pressure and is injected into the closed die. During the above time interval, the inside torpedo has an intermediate portion of cylindrical shape without a large diameter such that the decrease in the volume of the gap at the front edge portion of the valve housing due to the backward motion of the inside torpedo is small and the pressure in the gap does not increase. Therefore, upon backward movement, the resin for the core layer existing in the communicating hole of the inside torpedo is held in the inside torpedo. Thus, at the initial stage of the injection, the resin for the core layer is not mixed with the resin for the skin layer supplied from the outside passage to the portion before the inside torpedo.

Subsequently, by moving the inside torpedo forward to a predetermined first intermediate position, the inside passage is also opened and the fused resin for forming a core layer is supplied by pressure from the second injection unit to the inside passage. Thus, the fused resins flowing in both the inside and outside passages are injected into the die as a layered flow in which the core layer is perfectly surrounded by the skin layer. In this case, by controlling the position of the inside torpedo, the flow rate of the fused synthetic resin flowing from the outside and inside passages into the nozzle hole is controlled and a stable skin layer can be formed.

By moving the inside torpedo forward to a predetermined intermediate position, the outside passage is then closed and the resin for the skin layer is injected from the outside passage. After completion of the injection, only the injection of the resin for the core layer from the inside passage is executed for a limited time. The inside torpedo is then moved backward to a predetermined rear position and the inside passage is closed. A small quantity of the fused resin for forming the skin layer is injected from the first injection unit into the die, thereby forming the skin layer for covering the spool portion of the die and its periphery. A holding pressure is subsequently applied by the first injection unit to the fused resin filling the die.

Since the hole at the inner sealing portion of the nozzle tip has a small diameter, there is little resin for the core layer remaining in the small hole after injection. At the initial stage of the injection, the resin for the core layer can be completely injected into the die by the injection of a small quantity of resin for the skin layer. Upon backward movement of the inside torpedo mentioned above, the resin for the core layer in the communicating hole is held within the inside torpedo and is not mixed with the resin for the skin layer.

On the other hand, the inside torpedo is moved backward to its rearmost position by the reciprocation drive and the inside passage is closed by the sealing portion of the inside torpedo. In this state, the fused synthetic resin is supplied under pressure from the first injection unit into the outside passage, thereby injecting the resin into the die and executing single molding.

In the injection head of the present invention, by actuating the reciprocation drive, the inside torpedo is moved to the predetermined first intermediate position through the center shaft and both the outside and inside passages are opened to communicate with the nozzle hole. Either one of the first and second injection units is closed by the shut-off mechanism. The fused synthetic resin is injected into the die from the open injection unit. Gas is supplied under pressure from a gas supply port on the closed injection unit side through the other shut-off mechanism, thereby executing hollow or foaming molding.

In the present invention, there is no need to discharge a large quantity of the resin for the skin layer before the normal injection molding is started and this results in the simplification of the molding work and a reduction of molding time and labor as well as material costs. After completion of the injection of the resin for the core layer, the resin for the core layer remaining in the inner sealing portion at the small hole of the nozzle tip can be completely injected into the die at the initial stage of the injection by the injection of a small quantity of resin for the skin layer. Therefore, no defective portion occurs in the sandwich molded article. Consequently, good articles can be continuously molded at low cost. The invention is also excellent with respect to costs and application to mass production. In addition, since the invention has simple construction in which only the inside torpedo is reciprocated, the structure is strong and can carry out single molding.

In the present invention, in addition to the above effects, various kinds of molding such as hollow molding and foaming molding can also be performed. A structure which allows a single head to perform all the function of a number of special injection heads also results in substantial savings in equipment costs.

In the present invention, in addition to the above advantages, the main body of the injection head can be taken apart for easy inspection and cleaning.

DETAILED DESCRIPTION OF THE PREFERRED EMBODIMENTS

The first embodiment of an injection head according to the invention will be first explained with respect to the whole structure of an injection molding machine connected to a double-head injection unit.

Figure 1:
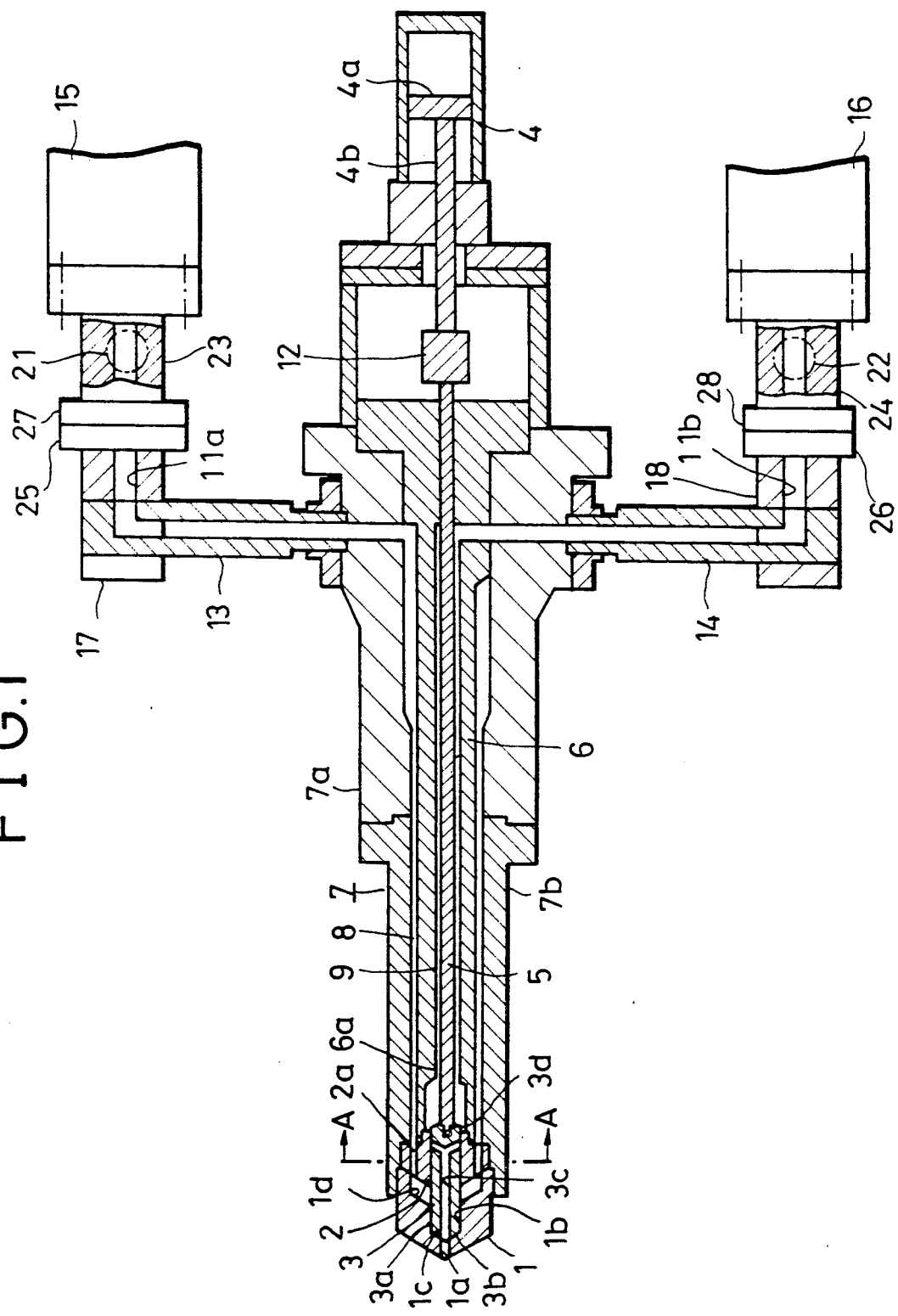
FIG. 1 is a cross-sectional view of the main section of a double-head injection molding machine having the first embodiment of an injection head according to the invention.
Figure 2:
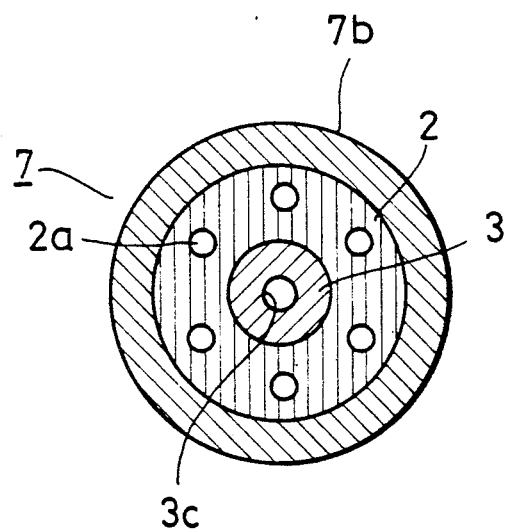
FIG. 2 is a cross-sectional view taken along line A—A in FIG. 1.

In FIG. 1, an injection head main body 7 can be taken apart into a plurality of parts. The nozzle tip 1 is attached by screw threads to the front edge portion of the nozzle portion 7b. The nozzle portion 7b is fixed to a base portion 7a by a bolt or the like (not shown) for easy disassembly. Two conduit lines 13 and 14 are arranged as connecting portion on the rear side of the base portion 7a so as to project to both sides. Connecting members 17 and 18 are connected to the two conduit lines 13 and 14, respectively.

A first injection unit 15 and a second injection unit 16 are mounted onto moving bases (not shown). Shut-off mechanisms for shut-off valves 21 and 22 and the like are provided for heads 23 and 24 of both of the injection units 15 and 16, respectively. A flange member 25 of the connecting member 17 is coupled to a flange member 27 of the head 23 of the first injection unit 15. A flange member 26 of the other connecting member 18 is coupled to a flange member 28 of the head 24 of the second injection unit 16. The first and second units 15 and 16 have first and second screws (not shown), respectively.

The injection head will now be described in detail with reference to FIG. 2 and FIGS. 3A–3F.

In the nozzle tip 1, there are formed: a nozzle hole 1a; a first conical hole 1c which enlarges towards the rear from the nozzle hole 1a; an inner sealing portion 1b consisting of a small hole having the same diameter in the axial direction as the rear of the first conical hole 1c; and a second conical hole 1d which enlarges to the rear from the inner sealing portion 1b. In the nozzle portion 7b, an outside torpedo 2 is arranged behind the nozzle tip 1. A plurality of through holes 2a are formed in the axial direction along the outer peripheral portion of the outside torpedo 2. The rear portion of the outside torpedo 2 is attached by screw threads to the front edge portion of the cylindrical valve housing 6. An outside passage 8 is formed between the outer peripheral surface of the valve housing 6 and the inner peripheral surface of the hole of the injection head main body 7 comprising the nozzle portion 7b and the base portion 7a. The rear edge of the outside passage 8 is closed in the axial direction and communicates with the conduit line 13. The front edge of the outside passage 8 communicates with the nozzle hole 1a through the plurality of through holes 2a of the outside torpedo 2.

An inside torpedo 3 having a cylindrical shape which is threadably attached to the tip portion of a center shaft 5, which will be explained hereafter, is inserted into the inner hole of the outside torpedo 2 so as to slide in the axial direction.

A sealing surface 3a which can be inserted into the inner sealing portion 1b is formed on the outer peripheral surface of the front edge portion of the inside torpedo 3. The inside torpedo 3 has a communicating hole 3c which extends in the axial direction from the center of the front edge portion and which branches into a plurality of holes which are branched toward the outer peripheral surface of the rear portion. Further, a sealing portion 3d which can be inserted into a sealing surface 6a consisting of a hole of the valve housing 6 is formed in the rear edge portion of the inside torpedo 3. An opening position at the outer peripheral surface of the rear portion of the communicating hole 3c of the inside torpedo 3 is set at a position such that upon forward movement of the inside torpedo 3, when the sealing surface 3a of the inside torpedo 3 starts to enter the inner sealing portion 1b (refer to FIG. 3E), the opening at the outer peripheral surface of the rear portion of the communicating hole 3c exits from the inner hole of the outside torpedo 2, and just before the inside torpedo 3 reaches the limit of its forward motion (refer to FIG. 3F), the opening enters the inner hole of the outside torpedo 2 and is completely closed. The length of the inside torpedo 3 is determined such that when the sealing portion 3d is inserted into the sealing surface 6a of the valve housing 6 and the inside passage 9 is closed (refer to FIG. 3B), most of the inside torpedo 3 is inside the outside torpedo 2 and outside passage 8 is fully opened.

The cross-sectional shape of each of the through holes 2a and the communicating hole 3c of both of the torpedoes 2 and 3 is not limited to the circular shape shown in the diagrams but can be formed in an arbitrary shape.

Further, the center shaft 5 of small diameter inserted in the valve housing 6 is fixed to the rear portion of the inside torpedo 3. The inside passage 9 is formed between the outer peripheral surface of the center shaft 5 and the inner peripheral surface of the valve housing 6. Although the rear edge of the inside passage 9 is closed in the axial direction, it communicates with the conduit line 14.

In the rear edge portion of the valve housing 6, the center shaft 5 is held in a sealed state although it can slide in the axial direction. The rear edge of the center shaft 5 projecting to the rear from the valve housing 6 is coupled with a piston rod 4 connected to a piston 4a in a hydraulic cylinder 4 which operates as a reciprocation drive through a connector 12. Thus, by supplying oil under pressure to the rear or front chamber of the piston 4a in the hydraulic cylinder 4, the inside torpedo 3 is moved forward or backward respectively through the center shaft 5 and can be moved or stopped at arbitrary positions (for instance, refer to FIGS. 3C, 3D, 3E and 3F) between the forwardmost position (refer to FIG. 3A) at which conical tip sealing surface 3b of the inside torpedo 3 closes the outside passage 8 and the rearmost position (refer to FIG. 3B) at which the sealing portion 3d is inserted into the sealing surface 6a of the valve housing 6.

The operation of the embodiment will now be described with reference to FIGS. 3A-3E and FIG. 4.

Figure 3A:
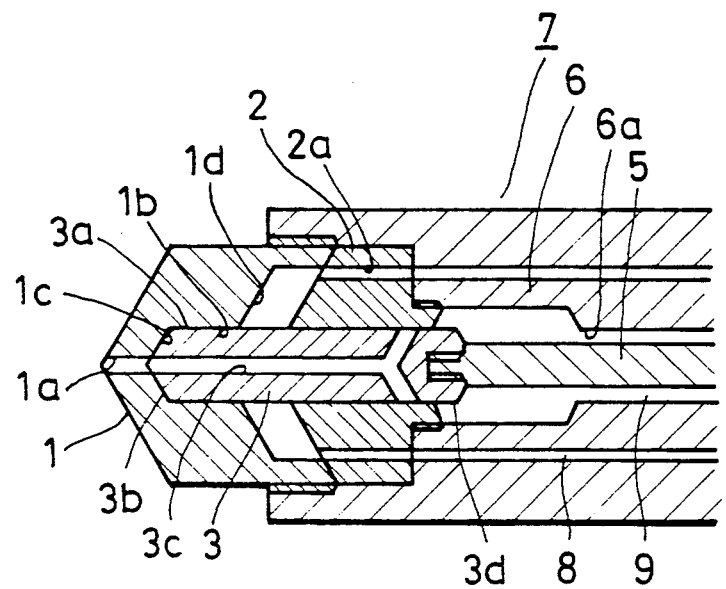
FIG. 3A is a cross-sectional view of the main section showing the state in which the inside torpedo is moved forward to the limit of its forward movement and both the inside and outside passages are closed.
Figure 3B:
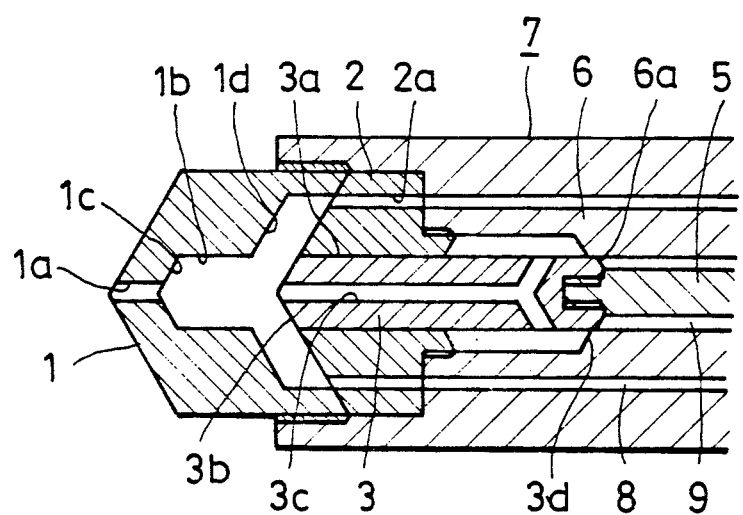
FIG. 3B is a cross-sectional view of the main section showing the state in which the inside torpedo is moved backward to the last rear position and the inside passage is closed.
Figure 3C:
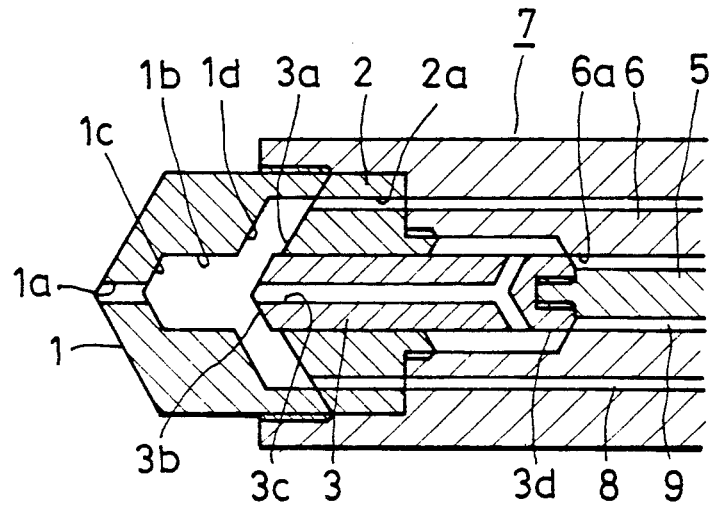
FIG. 3C is a cross-sectional view of the main section showing the state just before the sealing portion of the inside torpedo separates completely from the sealing surface of the valve housing after the inside torpedo is moved forward.
Figure 3D:
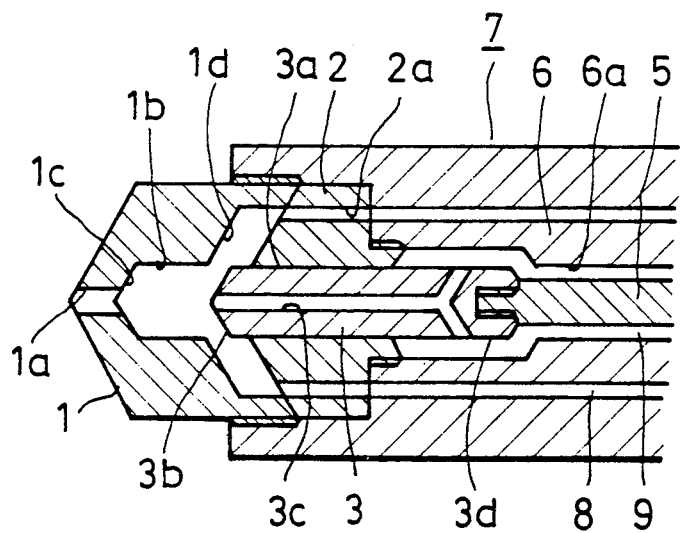
FIG. 3D is a cross section of the main section showing the state in which both the outside and inside passages are open at the predetermined first intermediate position.
Figure 3E:
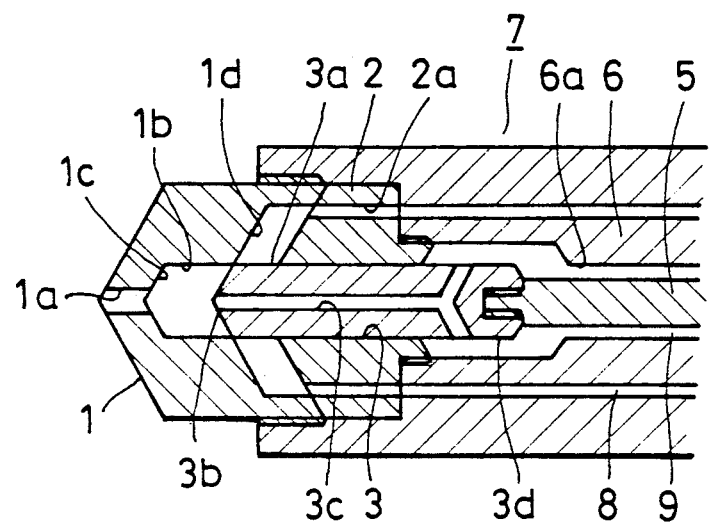
FIG. 3E is a cross-sectional view of the main section showing the state just before the sealing surface of the inside torpedo is inserted into the inner sealing portion of the nozzle tip.
Figure 3F:
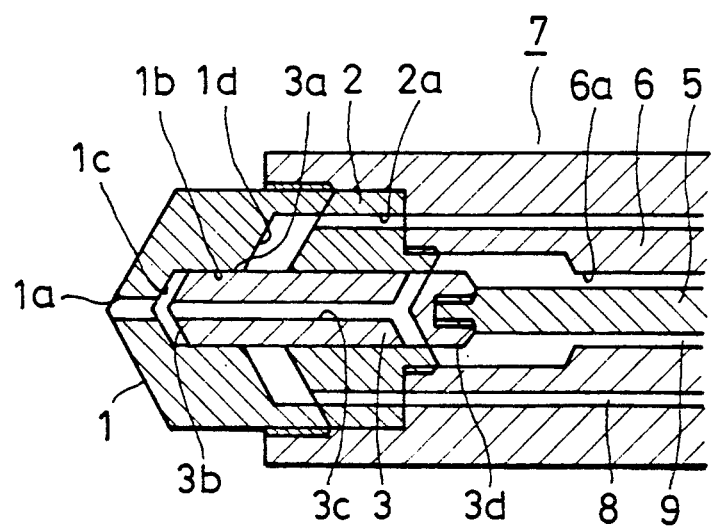
FIG. 3F is a cross-sectional view of the main section showing the state just before the front edge sealing surface of the inside torpedo is brought into contact with the first conical hole of the nozzle tip.
Figure 4:
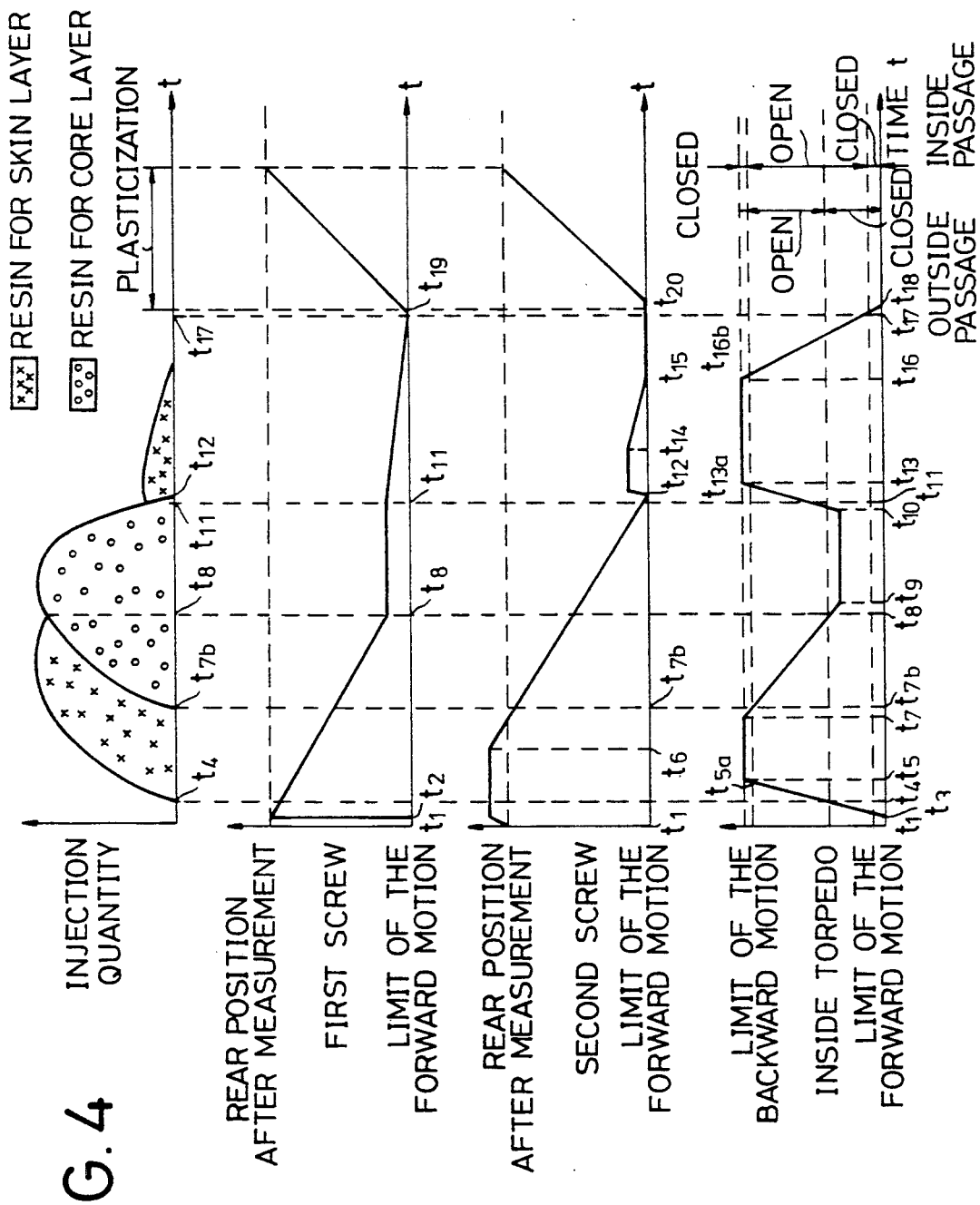
FIG. 4 is a diagram showing a series of molding steps according to the embodiment, in which the axis of the abscissa denotes a time t and the axis of the ordinate indicates the amount of injected fused resins for forming skin layers and core layers and variable positions of the first and second screws and an inside torpedo.

First, as shown in FIG. 3A, by moving the inside torpedo 3 forward, the sealing surface 3a is inserted into the inner sealing portion 1b, the conical tip sealing surface 3b is brought into contact with the first conical hole 1c, thereby closing the outside passage 8. On the other hand, the opening at the outer peripheral surface of the rear portion of the communicating hole 3c is closed by the outside torpedo 2, thereby closing the inside passage 9. In this state, the plasticizing operations of the first and second injection units 15 and 16 are started. After completion of the plasticizing operations, the second screw of the second injection unit 16 is quickly moved slightly backward at time $t_1$ and is stopped by time $t_6$. During the above period of time, the first screw of the first injection unit 15 is turned forward, that is, the injecting operation is started at time $t_2$ just after time $t_1$ and the injecting operation is continued until time $t_8$. The backward movement of the inside torpedo 3 is started at time $t_3$ just after time $t_2$. The inside torpedo is stopped at the rearmost limit of its movement at the predetermined rear position sown in FIG. 3B at time $t_5$ and is held at this position until time $t_7$. Thus, as shown in FIG. 3E, the outside passage 8 starts to open at time $t_4$. Further, the inside passage 9 starts to close at time $t_{5a}$ as shown in FIG. 3C.

Thus, for the interval from time $t_4$ to time $t_{7b}$, the fused resin for forming a skin layer is partially supplied under pressure into the outside passage 8 from the first injection unit 15 and is injected into the (sealed)closed die. Since pressure in the inside passage 9 is held at a negative pressure by the backward movement of the second screw, the resin for the core layer filling the inside passage 9 due to the previous injection molding is held within the second injection unit 16. In addition, since the inside torpedo 3 has a cylindrical shape without any intermediate large diameter portion, a decrease in the volume of the gap in the front edge portion of the valve housing 6 due to the backward movement of the inside torpedo 3 is small and the pressure in the gap doesn't rise. Therefore, upon the backward motion, the resin for the core layer remaining in the communicating hole 3c of the inside torpedo 3 is held within the inside torpedo 3. Thus, at the initial stage of the injection, the resin for the core layer is not mixed with the resin for the skin layer supplied from the outside passage 8 to the portion before the inside torpedo 3.

Subsequently, the forward movement of the second screw of the second injection unit 16, that is, the injecting operation, is started at time $t_6$. The injecting operation is continued until time $t_{12}$. As a result, the fused resin for forming the core layer is pressured into the inside passage 9 and the negative pressure in the inside passage 9 is offset. The forward movement of the inside torpedo 3 is started at time $t_7$. The inside torpedo 3 is stopped at a position between FIG. 3E and FIG. 3F, namely, at a predetermined second intermediate position at time $t_9$ and is stopped at this position until time $t_{10}$. During this period of time, the inside passage 9 starts to open at time $t_{7b}$ as shown in FIG. 3C. For the period of time from time $t_{7b}$ to time $t_8$, the inside torpedo 3 is located at the predetermined first intermediate position. Further, the outside passage 8 starts to close at time $t_8$ as shown in FIG. 3E.

Thus, for the time interval from time $t_{7b}$ to time $t_8$, the fused resins flowing in both of the passages 8 and 9 are injected into the die through the nozzle hole 1a as a layer-like flow in which the core layer is perfectly surrounded by the skin layer. For the period of time from time $t_8$ to time $t_{12}$ (for the period of time from time $t_8$ to time $t_{11}$, the inside torpedo 3 is located at the predetermined second intermediate position), only the fused resin for forming the core layer is injected into the die. Since there is little resin for the core layer remaining in the small hole at the inner sealing portion 1b of the nozzle tip 1 after injecting the core layer, it can be completely injected into the die at the initial stage of the injection by the injection of a small quantity of resin for the skin layer, which will be explained hereinafter, and no defective portion occurs in the molded article.

The backward movement of the inside torpedo 3 is started at time $t_{10}$. The inside torpedo 3 is stopped at the limit of its rearward movement at time $t_{13}$ as shown in FIG. 3B and is held at this position until time $t_{16}$. During this period of time, the outside passage 8 starts to open at time $t_{11}$ as shown in FIG. 3E. Further, the inside passage 9 starts to close at time $t_{13a}$ as shown in FIG. 3C (for the period of time from time $t_{11}$ to time $t_{13a}$, the inside torpedo 3 is located at the predetermined first intermediate position). The application of holding pressure is executed by the second injection unit 16. Subsequently, the forward movement of the first screw of the first injection unit 15 is started at time $t_{11}$ and the injection is continued until time $t_{19}$. On the other hand, the second screw of the second injection unit 16 is quickly moved slightly backward at time $t_{12}$ immediately after time $t_{11}$ and is stopped by time $t_{14}$. After that, the forward movement of the second screw is started at time $t_{14}$ and a holding pressure is applied by the second injection unit 16 until time $t_{15}$. Further, the forward movement of the inside torpedo 3 is started at time $t_{16}$. The inside torpedo 3 is stopped at the limit of its forward movement at time $t_{18}$ as shown in FIG. 3A. Thus, the inside passage 9 starts to open at time $t_{16b}$ as shown in FIG. 3C.

Thus, for the period of time from time $t_{12}$ to time $t_{17}$, only a small quantity of resin for the skin layer can be injected into the die. A sandwich molded article of good quality is obtained in which the spool of the die and its periphery are also covered by the skin layer. Even in this case, since the pressure in the inside passage 9 is in a negative pressure state due to the backward motion of the second screw, the resin for the core layer filling the inside passage 9 is held within the second injection unit 16. There is only a limited decrease in the volume of the gap in the front edge portion of the valve housing 6 due to the backward motion of the inside torpedo 3. Therefore, upon backward movement, the resin for the core layer remaining in the within the inside torpedo 3. Thus, at the initial stage of the injection, the resin for the core layer is not mixed with the resin for the skin layer supplied from the outside passage 8 to the portion before the inside torpedo 3. The holding pressure is applied by the first injection unit 15 for the period of time during which the outside passage 8 is open after time $t_{17}$.

Finally, for preparation of the next injection molding, the plasticizing operation of the first injection unit 15 is started at time $t_{19}$ and, further, the plasticizing operation of the second injection unit 16 is started at time $t_{20}$.

In the operation of the embodiment, an example is shown in which a predetermined rear position of the inside torpedo 3 has been set to the last rearward position in FIG. 3B. However, the predetermined rear position can also be set at a position between FIG. 3B and FIG. 3C.

In the operation of the embodiment, an example is shown in which the forward movement of the first screw of the first injection unit 15 is started just after the start of the backward movement of the second screw of the second injection unit 16 at time $t_1$ at the initial stage of the injection molding and, further, the backward movement of the inside torpedo 3 is started immediately thereafter. However, this invention is not limited to such an example. That is, if the above three kinds of starting operations are executed in a short time, the order of the above three kinds of starting operations can also be changed, or, either two or three of the starting operations can be simultaneously executed. On the other hand, an example is shown in which the backward movement of the second screw of the second injection unit 16 is started just after the start of the backward movement of the inside torpedo 3 at time $t_{10}$ during the latter half of the time of injection molding. However, in a manner similar to the above case, if two kinds of starting operations are executed in a short time, their order can be arbitrary.

Further, the starting order of the plasticizing operations of the first and second injection units 15 and is also not limited to the order shown in the embodiment and can also be reversed For single molding, either one of the shut-off valves 21 and 22 of the first and second injection units and 16 is opened and the other shut-off valve is closed. Explanation will now be given with respect to the case of, for instance, single molding by the first injection unit 15 by opening only the shut-off valve 21 of the first injection unit 15.

Hydraulic pressure is made to act on the piston 4a of the hydraulic cylinder 4 shown in FIG. 1 and the piston 4a is moved backward, thereby moving the inside torpedo 3 backward through the center shaft 5 to the last rear position and the inside passage 9 is closed by the sealing portion 3d as shown in FIG. 3B. In this state, by supplying the fused synthetic resin under pressure into the outside passage 8 from the first injection unit 15, the fused synthetic resin flows through the through holes 2a of the outside torpedo 2 and is injected into the die (not shown) from the nozzle hole 1a, to carry out single molding.

It is not always necessary to provide the foregoing two shut-off valves 21 and 22. In this case, the inside torpedo 3 is moved backward to the last rear position by the reciprocation drive and the inside passage is closed by the sealing portion 3d of the inside torpedo 3. In this state, the fused synthetic resin is supplied under pressure into the outside passage 8 from the first injection unit 15, thereby injecting the resin into the die and executing single molding.

Figure 5:
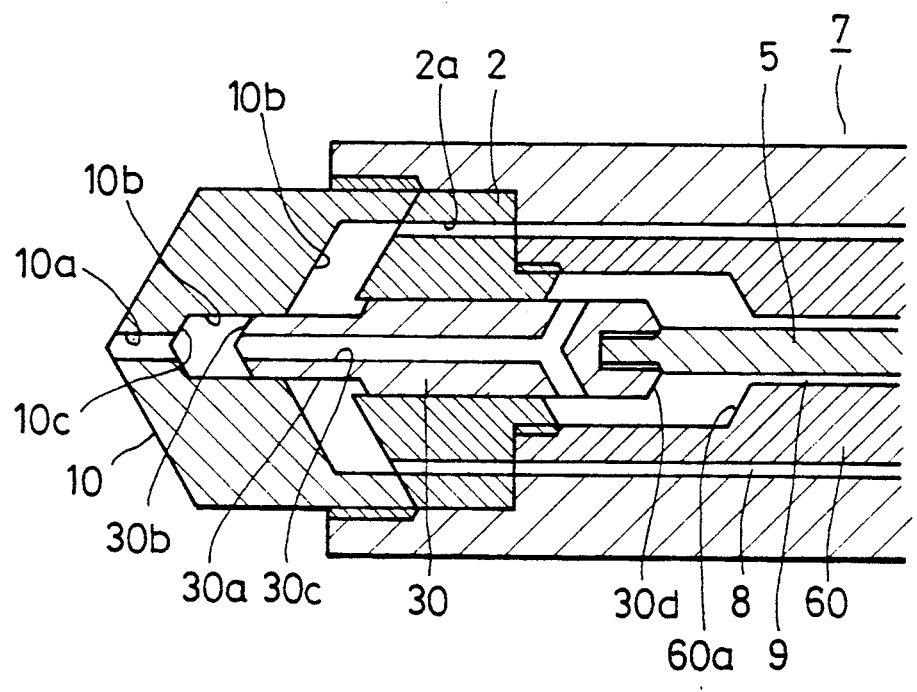
FIG. 5 is a cross-sectional view of the main section according to the second embodiment of the invention.

FIG. 5 shows the second embodiment of the injection head. The diameter of the hole of the valve housing 60 is set to be smaller than the diameter of the inside torpedo 30. The conical sealing portion 30d is formed at the rear edge surface of the inside torpedo 30. A conical sealing surface 60a is also formed in the valve housing 60 which corresponds with the conical sealing portion 30d. Further, the diameter of the front edge portion of the inside torpedo 30 in which the sealing surface 30a is formed is set to a small diameter. The diameter of the small hole in the inner sealing portion 10b of the nozzle tip 10 is set to a yet smaller diameter in correspondence with the small front edge portion. Since the construction of the other portion is similar to that of the first embodiment, its description is omitted.

In the embodiment, when the inside torpedo 30 is moved backward and the sealing portion 30d is brought into contact with the sealing surface 60a of the valve housing 60, the inside passage 9 is closed. Since the diameter of the small hole in the inner sealing portion 10b of the nozzle tip 10 is smaller than that of the first embodiment, the residual amount of resin for the core layer remaining in the inner sealing portion 10b after injection of the core layer is further decreased.

Figure 6:
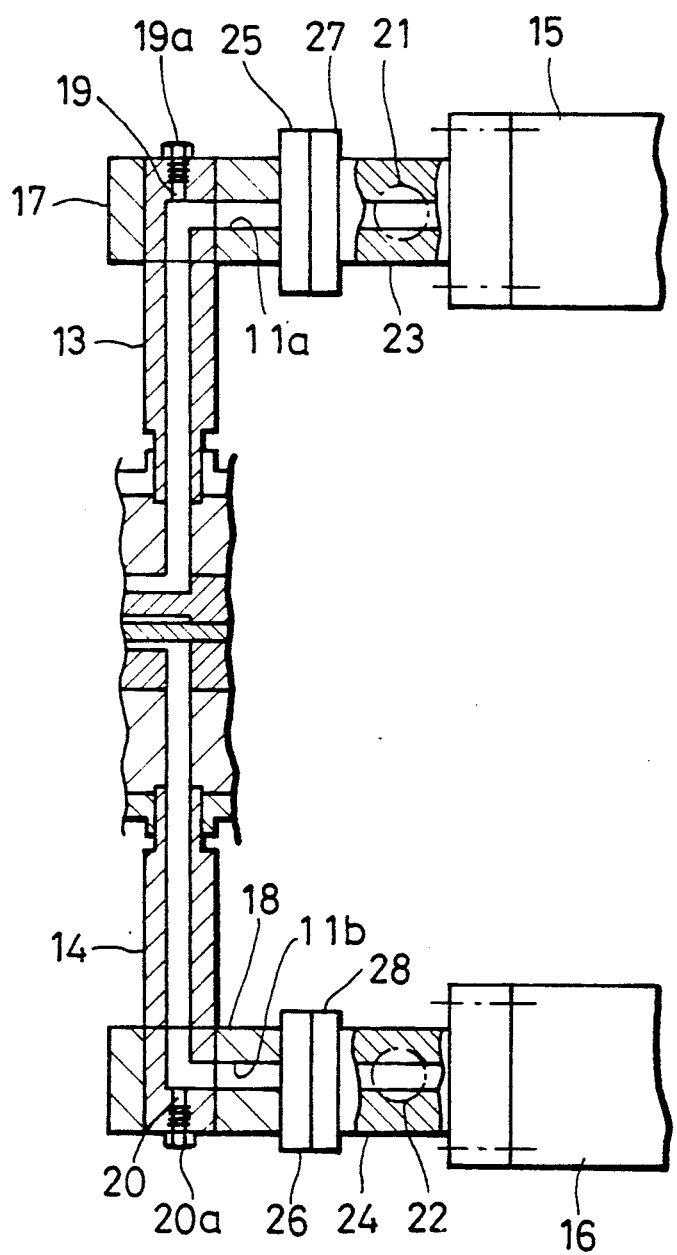
FIG. 6 is a cross-sectional view of the main section according to the third embodiment of the invention.
Figure 7:
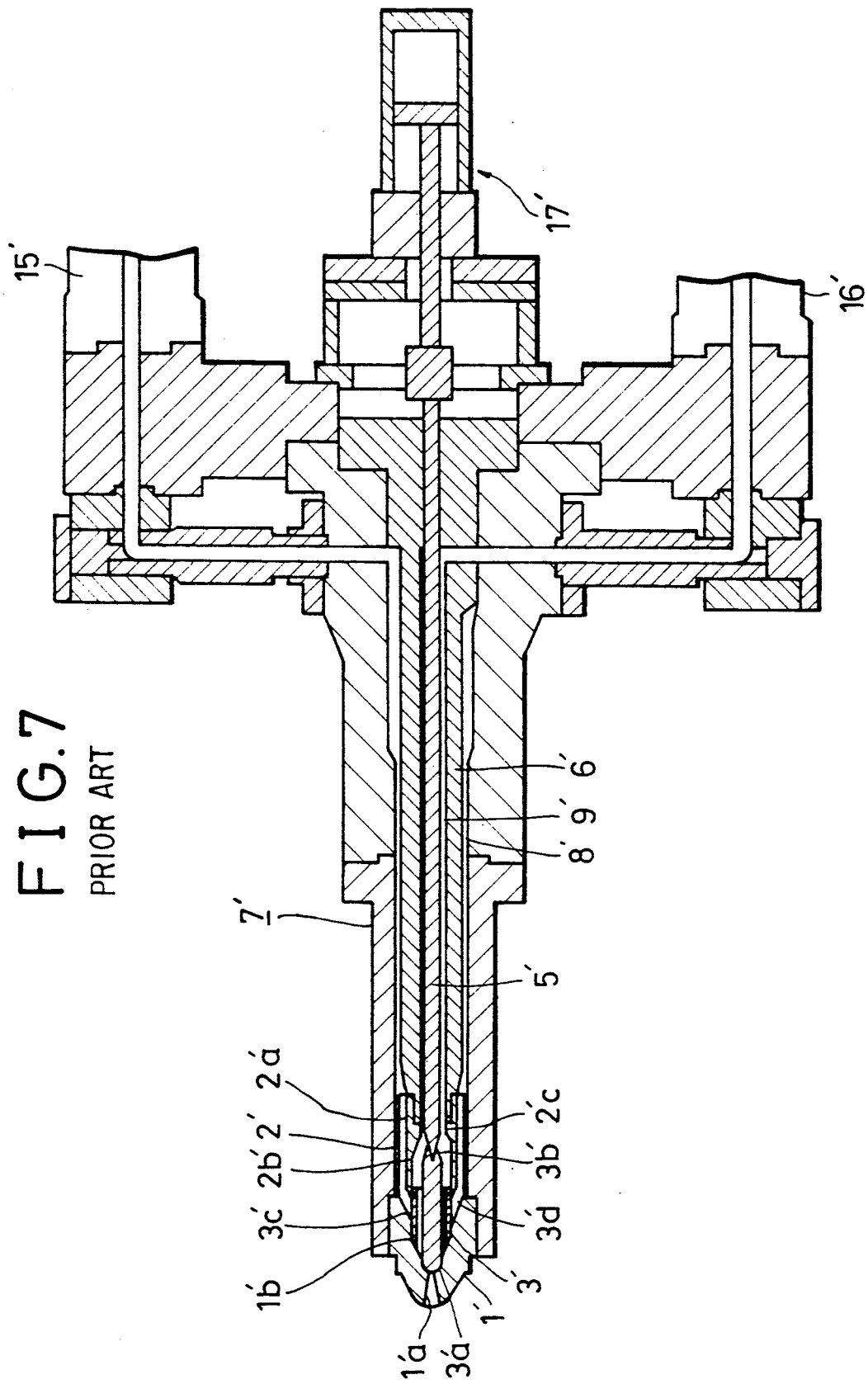
FIG. 7 is a cross-sectional view of a nozzle according to the prior art.
Figure 8:
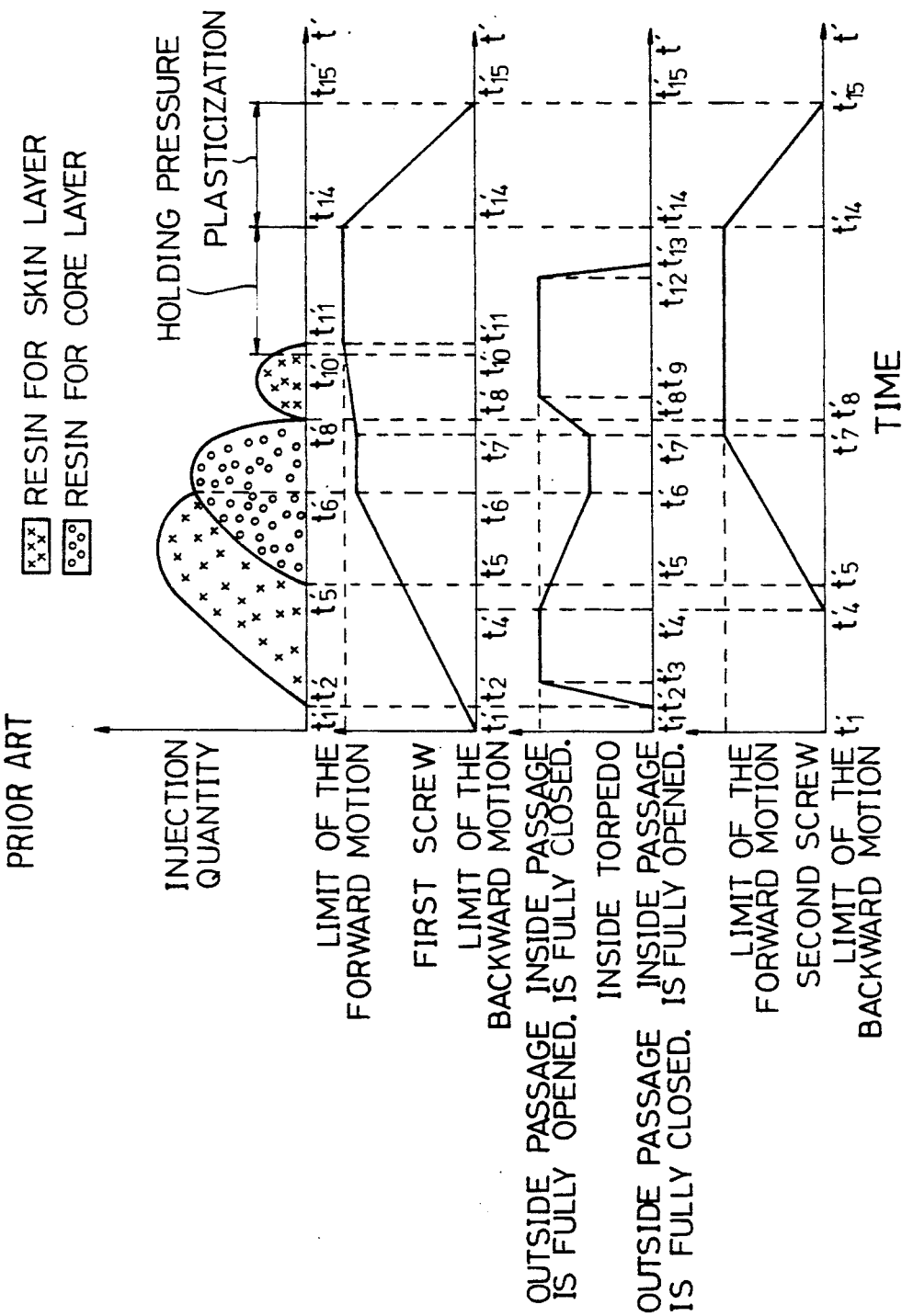
FIG. 8 is a diagram similar to FIG. 4 regarding the prior art.

In an embodiment of FIG. 6, gas supply ports 19 and 20 are formed in the two conduit lines 13 and 14 respectively. The gas supply ports 19 and 20 are closed by sealing screws 19a and 20a and sealing materials (not shown). The other features are the same as those of the first embodiment.

By using the injection head of the embodiment, in addition to the foregoing sandwich molding and single molding, hollow molding or foaming molding can be executed as will be explained hereinbelow.

An inside torpedo (not shown) is moved to the predetermined first intermediate position. Both outside and inside passages are opened to communicate with the nozzle hole. Either one of the first and second injection units 15 and 16 is closed by closing either one of the shut-off valves 21 and 22. A fused synthetic resin is supplied under pressure from the open injection unit 15 or 16 and is injected into the die. The sealing screw of the other closed injection unit is detached and gas is supplied under pressure from the gas supply port, thereby carrying out hollow molding or foaming molding.

On the other hand, the embodiment of FIG. 6 can also be applied to the injection head shown in FIG. 5 or the gas supply port can also be formed in only one of the conduit lines.

In each of the above embodiments, an example is shown in which conical tip sealing surfaces 3b and 30b are formed at the tips of the inside torpedoes 3 and 30 to correspondence to the first conical holes 1c and 10c of the nozzle tips 1 and 10 in order to securely close the outside passage 8. However, it is not always necessary to form the tip sealing surfaces 3b and 30b.

On the other hand, in place of providing the sealing portions 3d and 30d in the rear edge portions of the inside torpedoes 3 and 30, a sealing portion can also be provided in the tip portion of the center shaft 5.

Further, in place of providing the sealing surfaces 6a and 60a in the front edge portions of the valve housings 6 and 60, the outside torpedo 2 can be further extended to the rear and a sealing surface can also be formed in the rear edge portion.

There can be either a single opening or a multiple number of openings at the outer peripheral surfaces of the rear portions of the communicating holes 3c and 30c of the inside torpedoes 3 and 30.

It is to be understood that the above detailed description of the present invention is intended to disclose embodiments thereof to those skilled in the art, but that the invention is not to be construed as limited in its application to the details of construction and arrangements of parts illustrated in the accompanying drawings since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed is:

1. An injection head in which an injection head main body having a nozzle tip at a front edge portion has a hole in which a cylindrical outside torpedo is arranged behind the nozzle tip, a cylindrical valve housing located into said hole and formed with a sealing surface in the front edge portion, said housing being coupled to a rear edge portion of the outside torpedo, an outside passage formed between an inner peripheral surface of said hole and an outer peripheral surface of the valve housing, a center shaft which is reciprocated by a reciprocation drive being located into the valve housing, and an inside passage being located between the outer peripheral surface of the center shaft and the inner peripheral surface of the valve housing, wherein said nozzle tip has a first conical hole enlarging from the nozzle hole towards the rear of said nozzle tip, an inner sealing portion consisting of a small hole connected with the first conical hole and having a constant diameter in an axial direction and a second conical hole enlarging from the inner sealing portion towards said rear, the injection head further having, an inside torpedo having a cylindrical shape fixed to a tip portion of the center shaft is slidably guided to the inner hole of the outside torpedo, a sealing surfaces which is movable into the inner sealing portion is located on the outer peripheral surface of the front edge portion of the inside torpedo, the inside torpedo having a communicating hole communicating the center of the front edge of the inside torpedo with the outer peripheral surface of the rear portion of said inside torpedo, a sealing portion corresponding to the sealing surface of the valve housing being located int he rear edge portion of the inside torpedo, and wherein the position of the opening at the outer peripheral surface of the rear portion of the communicating hole of the inside torpedo is set at a position such that upon forward movement of the inside torpedo, and when the insertion of the sealing surface of the inside torpedo into the inner sealing portion is started, the opening is not yet inserted into the inner hole of the outside torpedo, and just before the inside torpedo reaches a limit of its forward movement, the opening is inserted into the inner hole of the outside torpedo and is completely closed.

2. An injection head according to claim 1, wherein a conical front edge sealing surface is formed at the front edge of the inside torpedo which corresponds to the first conical hole of the nozzle tip.

3. An injection head according to claim 1 or 2, wherein a sealing portion is formed in the top portion of the center shaft in place of forming the sealing portion int he rear edge portion of the inside torpedo.

4. An injection head according to claim 3, wherein a sealing surface is formed in the rear edge portion of the outside torpedo in place of forming the sealing surface int he front edge portion of the valve housing.

5. An injection head according to claim 4, wherein the outside passage and the inside passage of the injection head main body are connected to a first injection unit and a second injection unit through shut-off mechanisms, respectively.

6. An injection head according to claim 5, wherein at least one gas supply port is provided for at least one of two connecting portions to the first injection unit and the second injection unit of the injection head main body.

7. An injection head according to claim 6, wherein the injection head main body can be disassembled into a plurality of parts.

* * * * *